(12) United States Patent
Krasnoff

(10) Patent No.: US 11,598,383 B2
(45) Date of Patent: Mar. 7, 2023

(54) BRAKING SYSTEM

(71) Applicant: Duplicent, LLC, Santa Monica, CA (US)

(72) Inventor: Curren Krasnoff, Pacific Palisades, CA (US)

(73) Assignee: DUPLICENT, LLC, Santa Monica, CA (US)

( * ) Notice: Subject to any disclaimer, the term of this patent is extended or adjusted under 35 U.S.C. 154(b) by 47 days.

(21) Appl. No.: 17/340,224

(22) Filed: Jun. 7, 2021

(65) Prior Publication Data

US 2021/0293289 A1    Sep. 23, 2021

Related U.S. Application Data

(63) Continuation of application No. 17/046,441, filed as application No. PCT/US2019/027237 on Apr. 12, 2019, now Pat. No. 11,053,994.

(60) Provisional application No. 62/657,524, filed on Apr. 13, 2018.

(51) Int. Cl.
| | |
|---|---|
| *F16D 63/00* | (2006.01) |
| *B60T 1/14* | (2006.01) |
| *B61H 7/06* | (2006.01) |
| *B61H 13/20* | (2006.01) |
| *F16D 65/16* | (2006.01) |
| *F16D 121/02* | (2012.01) |
| *F16D 121/24* | (2012.01) |

(52) U.S. Cl.
CPC ............... *F16D 63/00* (2013.01); *B60T 1/14* (2013.01); *B61H 7/06* (2013.01); *B61H 13/20* (2013.01); *F16D 65/16* (2013.01); *F16D 2121/02* (2013.01); *F16D 2121/24* (2013.01)

(58) Field of Classification Search
CPC .. F16D 63/00; B60T 1/14; B61H 7/06; B61H 13/20
USPC ............................................................. 188/5
See application file for complete search history.

(56) References Cited

U.S. PATENT DOCUMENTS

| | | | |
|---|---|---|---|
| 1,330,110 | A | 2/1920 | Daniels |
| 1,924,276 | A | 8/1933 | Gerstenberger |
| 2,886,139 | A | 5/1959 | Wilson |
| 3,145,796 | A | 8/1964 | Padula |
| 4,317,507 | A | 3/1982 | Mcmillan |
| 9,487,190 | B1 * | 11/2016 | Alvarado .................. B60T 1/14 |

(Continued)

FOREIGN PATENT DOCUMENTS

| | | | |
|---|---|---|---|
| CN | 204161328 | 2/2015 | |
| DE | 19823228 A1 * | 12/1999 | ................ B60T 1/14 |

(Continued)

OTHER PUBLICATIONS

International Preliminary Report on Patentability for International Application No. PCT/US2019/027237, dated Oct. 13, 2020, 10 pages.

(Continued)

*Primary Examiner* — Melanie Torres Williams
(74) *Attorney, Agent, or Firm* — Cooley LLP

(57) ABSTRACT

A braking system includes a frame, an actuator coupled to the frame, a rotating joint coupled to the actuator and the frame, an arm coupled to the rotating joint, a brake pad having a connector, the connector pivotably coupled to the arm, and a torsion spring positioned at the connector to bias the brake pad relative to the arm.

7 Claims, 12 Drawing Sheets

(56) References Cited

U.S. PATENT DOCUMENTS

2013/0037355 A1    2/2013   Baker et al.
2016/0052493 A1*   2/2016   Rydsmo .................... B60T 1/14
                                                                                        188/5

FOREIGN PATENT DOCUMENTS

| EP | 3243714 A1 * | 11/2017 | |
|---|---|---|---|
| GB | 2470229 A * | 11/2010 | ................ B60T 1/14 |
| WO | WO-2010066021 A1 * | 6/2010 | ........... F16D 65/092 |
| WO | WO-2017/117303 | 7/2017 | |

OTHER PUBLICATIONS

International Search Report and Written Opinion for International Application No. PCT/US2019/027237, dated Jul. 5, 2019, 12 pages.

* cited by examiner

BRAKING SYSTEM

CROSS-REFERENCE TO RELATED PATENT APPLICATIONS

This application is a continuation of U.S. patent application Ser. No. 17/046,441, filed Oct. 9, 2020, which is a 371 national application of International Patent Application No. PCT/US2019/027237, filed Apr. 12, 2019, which claims the benefit of and priority to U.S. Provisional Patent Application No. 62/657,524, filed Apr. 13, 2018, all of which are incorporated herein by reference in their entireties.

BACKGROUND

The present disclosure relates to vehicle braking systems, and in particular to emergency braking systems for vehicles. Although the examples used herein describe braking systems for automobiles (e.g., cars, trucks, buses, etc.), it should be understood that the disclosure herein also contemplates braking systems for other vehicles such as trains, trolleys, street cars, aircraft, ships, boats, etc., and for trailers or other devices towed by automobiles or other vehicles.

Vehicle collisions (crashes, accidents, etc.) are prevalent throughout the world, and cause a significant number of deaths and injuries in addition to economic losses. Most attempts to improve automobile safety have focused primarily on reducing the effects of impacts resulting from collisions. Examples include improvements in the design of safety belts, mandating the use of properly fitted child seats, the introduction of air bags in steering wheels and elsewhere in the vehicle, and the inclusion of kinetic energy absorbing bumpers and crumple zones in vehicle design. While such efforts have been successful in reducing the numbers of vehicle accident-related deaths and reducing the severity of accident-related injuries, they do not contribute to reducing the actual number of accidents.

More recently, active vehicle crash avoidance systems have been implemented in some luxury vehicles. Such systems typically rely on proximity sensors and/or artificial vision systems to monitor the vehicle's immediate environment. When a potentially hazardous situation is identified (for example, an unacceptably short distance between vehicles) the system can apply the vehicle's brakes in order to reduce speed, potentially avoiding an impact. Such systems, however, are reliant on the normal functioning of the vehicle's braking system and drive train. As such there are a number of circumstances (for example, loss of brake hydraulic pressure, inadequate stopping distance) under which such systems can provide little, if any, protective effect.

Accordingly, a braking system that can consistently and effectively reduce vehicle speed in an emergency situation may be desirable.

SUMMARY

One implementation of the present disclosure is a braking system. The braking system includes a frame, a linear actuator coupled to the frame, a rotating joint coupled to linear actuator and the frame, a force applicator coupled to the rotating joint, and a friction mat coupled to the force applicator. The first linear actuator is operable to cause the rotating joint to rotate relative to the frame and the force applicator is operable to vary a distance between the friction mat and the rotating joint.

Another implementation of the present disclosure is a method. The method includes coupling a braking system to a vehicle, controlling a linear actuator of the braking system to cause rotation of a force applicator of the braking system relative to the vehicle, controlling the force applicator to force a frictional mat coupled to the force applicator away from the vehicle.

DETAILED DESCRIPTION

Figure 1:
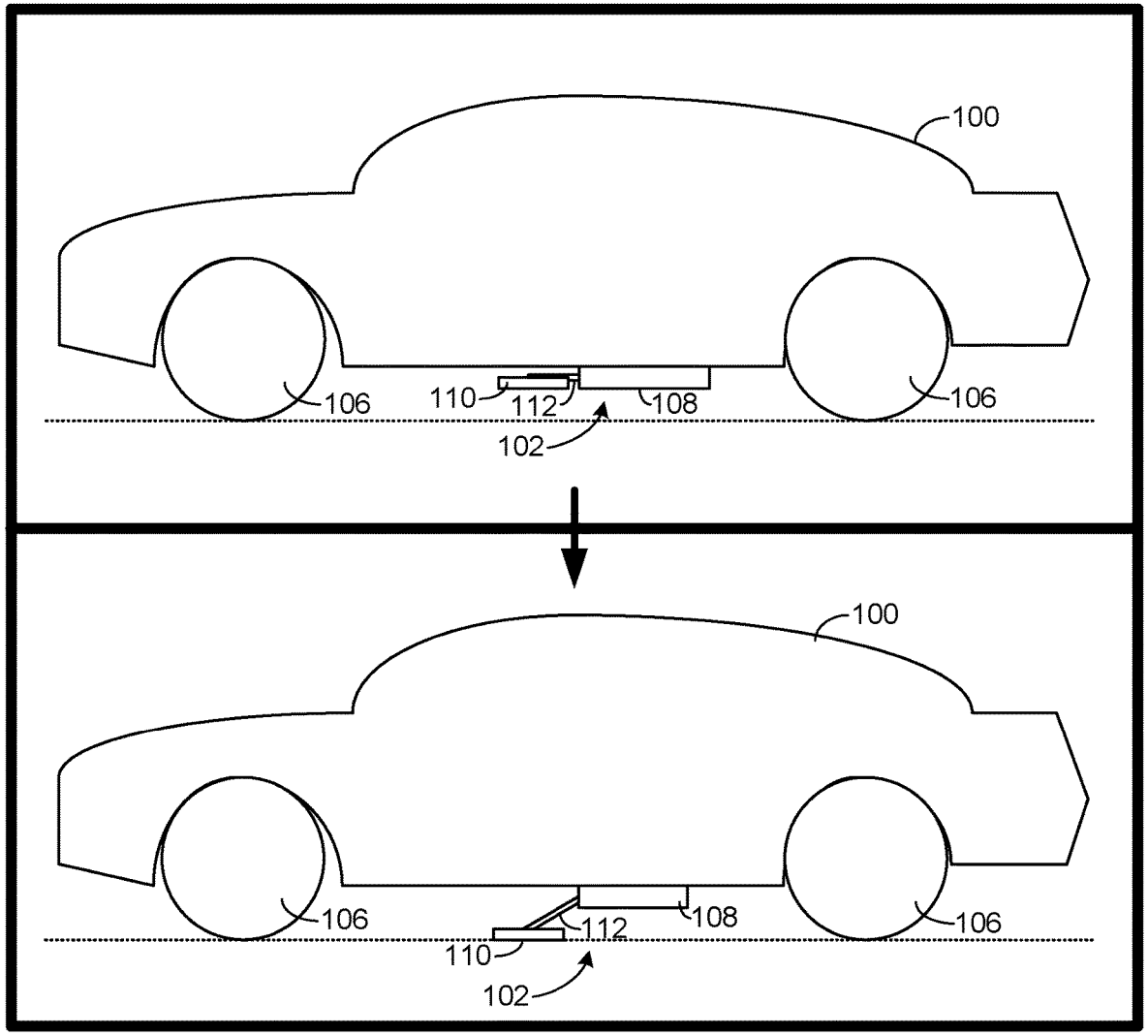
FIG. 1 is a side view of a vehicle equipped with a braking system, according to an exemplary embodiment.
Figure 2:
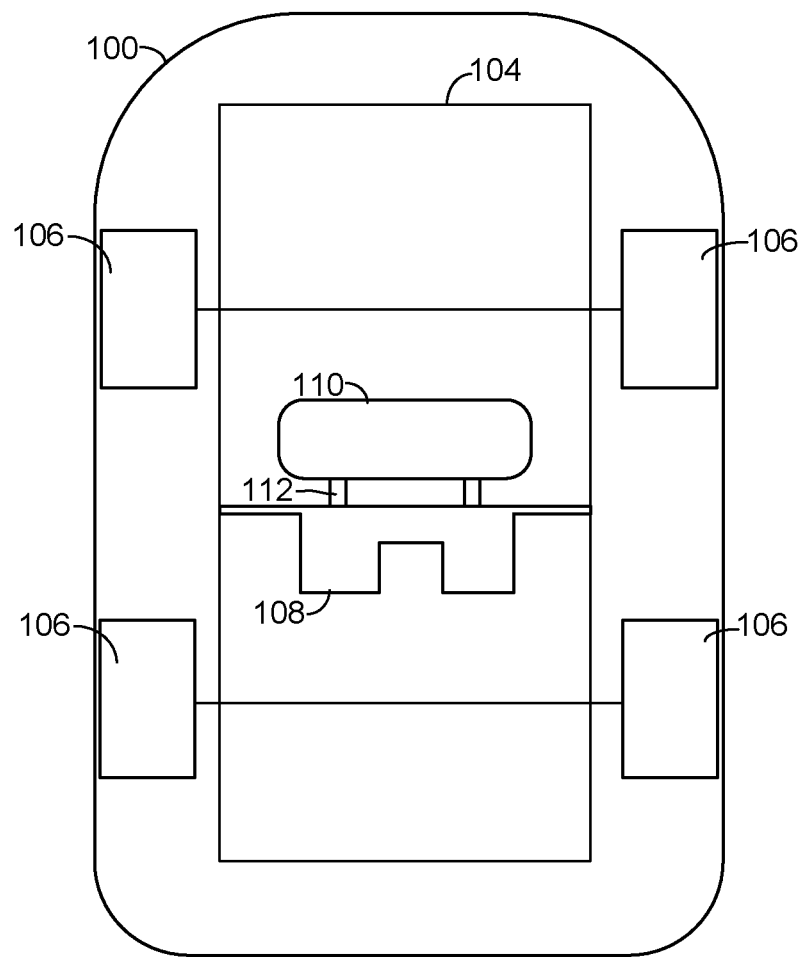
FIG. 2 is a bottom view of the vehicle of FIG. 1, according to an exemplary embodiment.

Referring to FIGS. 1-2, a vehicle 100 equipped with a braking system 102 is shown, according to an exemplary embodiment. In the example shown, the vehicle 100 is a car (e.g., a passenger vehicle). In other embodiments, the vehicle 100 may be a sport utility vehicle, van, truck, train, street car, trolley, ship, boat, etc. FIG. 1 illustrates operation of the braking system 102 by showing a pair of sequential side views of the vehicle 100 with the braking system 102. FIG. 2 shows a bottom view of the vehicle 100 with the braking system 102.

As shown in FIGS. 1-2, the braking system 102 is mounted on an underside of the vehicle 100. That is, when the vehicle is upright as shown in FIG. 1, the braking system 102 is positioned between the vehicle 100 and a roadway, path, or other surface above which the vehicle is located or across which the vehicle 100 is travelling (the "travelling surface"). In the example shown, the vehicle 100 includes a chassis 104 coupled to wheels 106. The wheels 106 support the chassis 104 and the vehicle 100 above the travelling surface. The wheels 106 provide a spacing between the chassis 104 and the travelling surface, for example providing a separation therebetween approximately equal to a radius of the wheels 106. The braking system 102 is coupled to the chassis 104 and positioned adjacent such spacing. Although the embodiments shown and described herein depict the braking system 102 as separable from the vehicle 100 and configured to be constructed and installed as an after-market feature, in other embodiments the braking system 102 is an integral part of the vehicle 100 and is formed during manufacture of the vehicle 100.

The braking system 102 includes a non-moving portion 108 fixedly coupled to the chassis 104, a moveable portion 110, and arms 112 that connect the moveable portion 110 to the non-moving portion 108. As described in detail below, the arms 112 are pivotally connected to the non-moving portion 108.

The braking system 102 is controllable to extend across the spacing between the chassis 104 and the travelling surface to create a frictional, braking force between the vehicle 100 and the travelling surface. FIG. 1 provides a storyboard-style animation of such operation. As shown in the first frame 150 of the storyboard of FIG. 1, the braking system 102 is in a non-deployed state in which the arms 112 are oriented substantially parallel to the travelling surface and the moveable portion 110 is held away from the travelling surface. Between the first frame 150 and the second frame 152, the braking system 102 is deployed, i.e., controlled to a deployed state in which the arms 112 pivot towards the travelling surface and the moveable portion 110 is brought into contact with the traveling surface. As described in detail below, the braking system 102 includes various force-application mechanisms configured to initiate and sustain a force between the travelling surface and the moveable portion 110. The braking system 102 thereby creates friction between the vehicle 100 and the travelling surface that resists, slows, stops, etc. movement of the vehicle 100 along the travelling surface.

The vehicle 100 can include an onboard computing system configured to control the braking system 102. The braking system 102 may be deployed as animated in FIG. 1 in response to one or more of various triggers. For example, in some embodiments, deployment of the braking system 102 can be initiated, at least in part, by actions taken by an operator of the vehicle 100. For example, in some embodiments, depression of a brake pedal of the vehicle past a predetermined point (e.g. 80%, 90%, etc. of the full travel path of the brake pedal) can trigger deployment of the braking system 102. In some embodiments, pressing the brake pedal past a predetermined activation point can control the amount of pressure applied through the braking system 102, for example through a hydraulic or similar mechanism, for example to increase the amount of downward force exerted by the braking system 102 on the travelling surface. In such an embodiment, feedback (e.g. tactile feedback) can be transferred to the vehicle operator through the brake pedal. In some embodiments, sudden and/or rapid depression of the brake pedal can be used to trigger deployment of the braking system 102.

In some embodiments, the vehicle 100 includes various sensors configured to provide data relating to objects, people, other vehicles, road conditions, etc. surrounding the vehicle 100. In various embodiments, such sensors include cameras, proximity sensors, ultrasonic sensors, infrared sensors, motion detectors, radar, lidar, etc. Data from the sensors can be processed by a computing system onboard the vehicle 100 (e.g., using a machine learning or artificial intelligence program) and used to predict potential collisions between the vehicle 100 and other objects. In such embodiments, deployment of the braking system 102 can be initiated autonomously to reduce a risk of a predicted collision.

FIGS. 1-2 show the vehicle 100 as including one braking system 102. In other embodiments, multiple braking systems 102 (e.g., 2, 3, 4, etc.) can be included. For example, multiple braking systems 102 can be arranged linearly along or across the chassis 104. As another example, multiple braking systems 102 can be arranged in a grid (e.g., a two-by-two array). Various arrangements are contemplated by the present disclosure.

Figure 3:
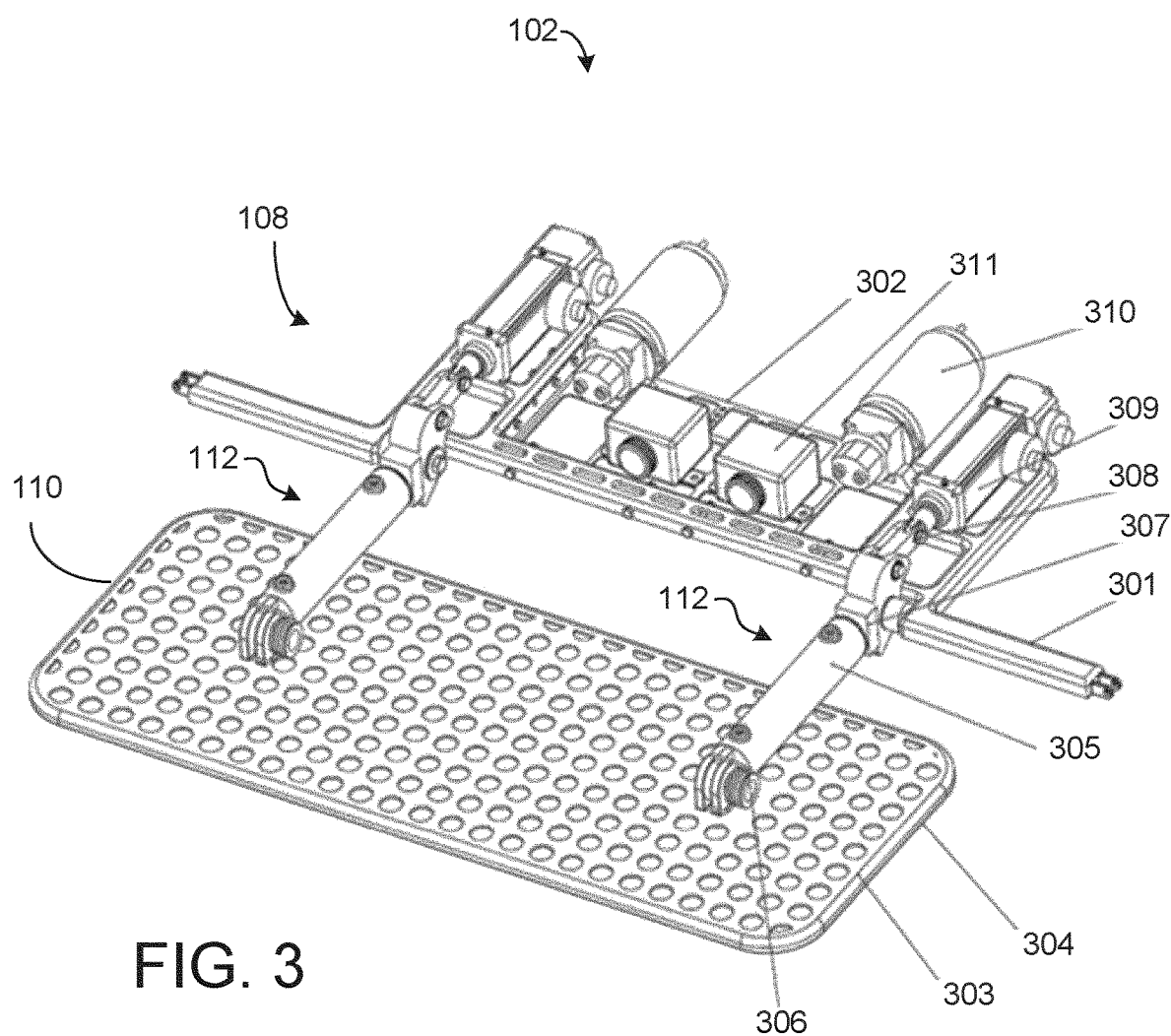
FIG. 3 is a perspective view of the braking system of FIG. 1 in a non-deployed state, according to an exemplary embodiment.
Figure 4:
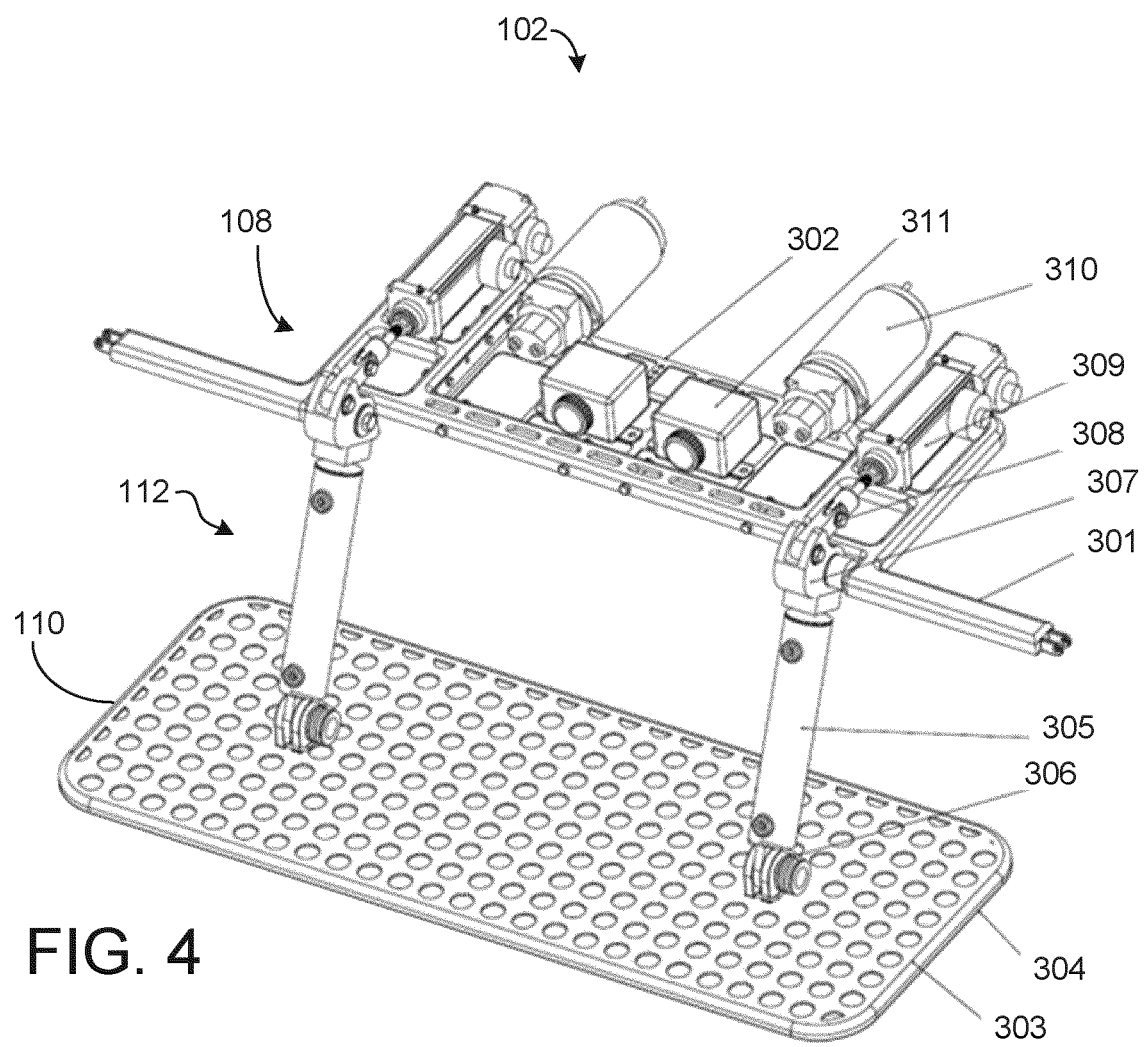
FIG. 4 is a perspective view of the braking system of FIG. 1 in a deployed state, according to an exemplary embodiment.
Figure 5:
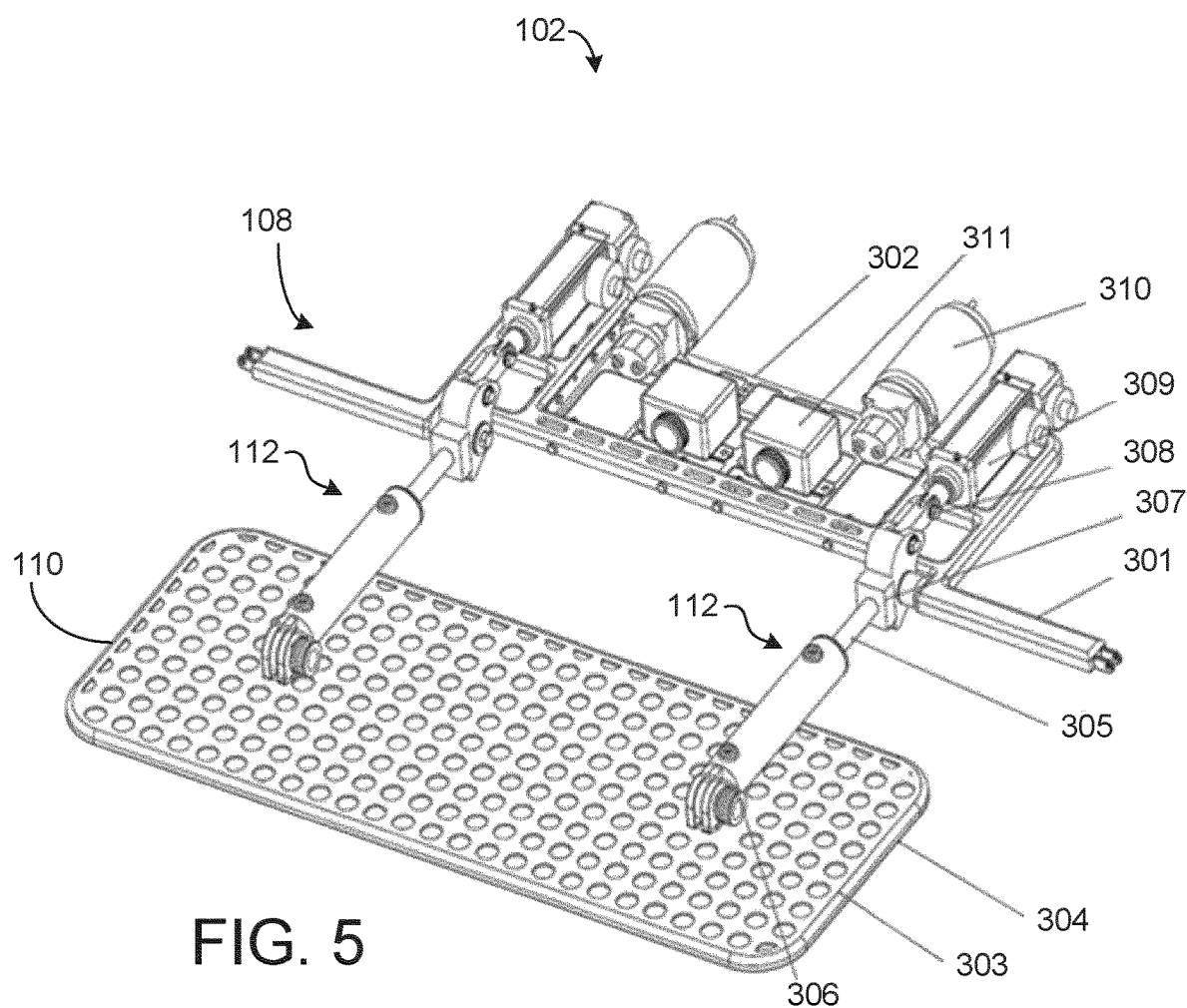
FIG. 5 is a perspective view of the braking system of FIG. 1 in an extended state, according to an exemplary embodiment.

Referring now to FIGS. 3-5, perspective views of the braking assembly 102 are shown, according to an exemplary embodiment. FIG. 3 shows the braking assembly 102 in the non-deployed state, FIG. 4 shows the braking assembly 102 in the deployed state, and FIG. 5 shows the braking assembly 102 in a force application state.

The braking assembly 102 is shown to include the non-moving portion 108 and moveable portion 110 coupled together via arms 112. The non-moving portion 108 is shown to include a support frame 301, a support plate 302, and various components mounted thereon and described in detail below. The moveable portion 110 is shown to include a reinforcing plate 303 and a friction mat 304. The arms 112 include force applicators 305 shown as coupled to the non-moving portion 108 by rotating joints 307 and coupled to the moveable portion 110 by pivoting connectors 306. Various features are shown in additional detail in FIGS. 6-16 and are described in detail with reference thereto below.

Still referring to FIGS. 3-5, the non-moving portion 108 includes linear actuator 309 coupled to the support frame 301 via rods 308 and configured to cause rotation of the rotating joints 307. That is, the linear actuator 309 is configured to move the rod 308 linearly in a direction substantially parallel with the direction of travel of the vehicle 100 and substantially parallel with the plane defined by the frame 301. The rod 308 engages the rotating joint 307. When the rod 308 is pushed towards the rotating joint 307 by the linear actuator 309, the rotating joint 307 rotates downwards, i.e., away from the vehicle 100 and towards the travelling surface. The arms 112 are coupled to the rotating joint 307 such that, when the rod 308 is pushed towards the rotating joint 307 by the linear actuator 309, the arms 112 rotate away from the vehicle 100 and towards the travelling surface (i.e., away from an orientation substantially parallel with the travelling surface and in the plane of the frame 301 as shown in FIG. 3 and to an orientation at a non-zero angle relative to the traveling surface and the plane of the frame 301 as shown in FIG. 4). The linear actuator 309 is also configured to retract the rod 308, which causes the rotating joint 307 to rotate towards the vehicle, thereby moving the arms 112 from the deployed state of FIG. 4 to the non-deployed state of FIG. 3.

The non-moving portion 108 also includes hydraulic pump 311 and hydraulic reservoir 310 coupled to the support frame 301. The hydraulic pump 311 is configured to pump hydraulic fluid from the hydraulic reservoir 310 into the force applicator 305 to extend the force applicator 305 from the retracted position of FIG. 3 to the extended position of FIG. 5. The hydraulic pump 311 is also configured to pump hydraulic fluid out of the force applicator 305 to the hydraulic reservoir 310 to retract the force applicator 305 from the extend position shown in FIG. 5 to the retracted position shown in FIGS. 3 and 4.

Although FIG. 5 shows the force applicator 305 extended while the arms 112 are oriented parallel to the frame 301 (i.e., with the braking assembly in the non-deployed configuration), it should be understood that the hydraulic pump 311 is also operable to extend the force applicators 305 while arms 112 are oriented at an angle to the frame 301 (i.e., with the braking assembly in the deployed configuration). The force applicators 305 are extendable to bring the moveable portion 110 in contact with the travelling surface and to exert a force on the travelling surface via the moveable portion 110. When the moveable portion 110 is in contact with the travelling surface, the hydraulic pumps 311 exert a force between the travelling surface and the vehicle 100 along the direction of the arms 112. In such a configuration, the moveable portion 110 exerts a force on the travelling surface equal to at least a portion of the force generated by the hydraulic pumps 311, which in turn creates friction between the moveable portion 110 and the travelling surface that resists movement of the vehicle 100.

To deploy the braking system 102 to resist movement of the vehicle 100 (e.g., to slow the vehicle to avoid a collision), the linear actuators 309 are controlled to extend from the retracted position of FIG. 3 to the extend position of FIG. 4, causing the arms 112 to rotate towards the travelling surface and thereby moving the moveable portion 110 towards the travelling surface. The hydraulic pumps 311 then operate to extend the force applicators 305 to force the moveable portion 110 into contact with the travelling surface and to initiate and sustain a force between the moveable portion 110 and the travelling surface. Friction between the moveable portion 110 and the travelling surface resists movement of the vehicle 100 relative to the travelling surface. As the force exerted by the force applicators 305 increases, the friction also increases.

The friction can be removed by operating the hydraulic pumps 311 to retract the force applicators 305 and by operating the linear actuators 309 to retract the rods 308 to return the braking system 102 to the non-deployed state of FIG. 3. In some embodiments, the braking system 102 can be repeatedly and deployed and retracted to allow for repeated use of the braking system 102. In other embodiments, the braking system 102 is configured to provide a single emergency use before full or partial replacement and/or other manual maintenance is required.

In some embodiments, a force-absorbing protection plate (pad, mat, structure, etc.) is positioned between the non-moveable portion 108 and the vehicle 100. The force-absorbing protection plate is configured to absorb forces exerted on or by the braking system 102 to reduce a risk of damage to the vehicle 100 associated with deployment of the braking system 102. In some embodiments, a temporary locking mechanism is included which engages the braking system 102 when the braking system 102 is deployed. In such embodiments, the temporary locking mechanism (e.g., a ridge) is configured to substantially prevent upwards movement of the braking assembly 102 relative to the vehicle 100 when the braking system 102 is deployed. The temporary locking mechanism may be fixed in position or may be mechanically caused to lower with deployment of the braking system 102.

Figure 6:
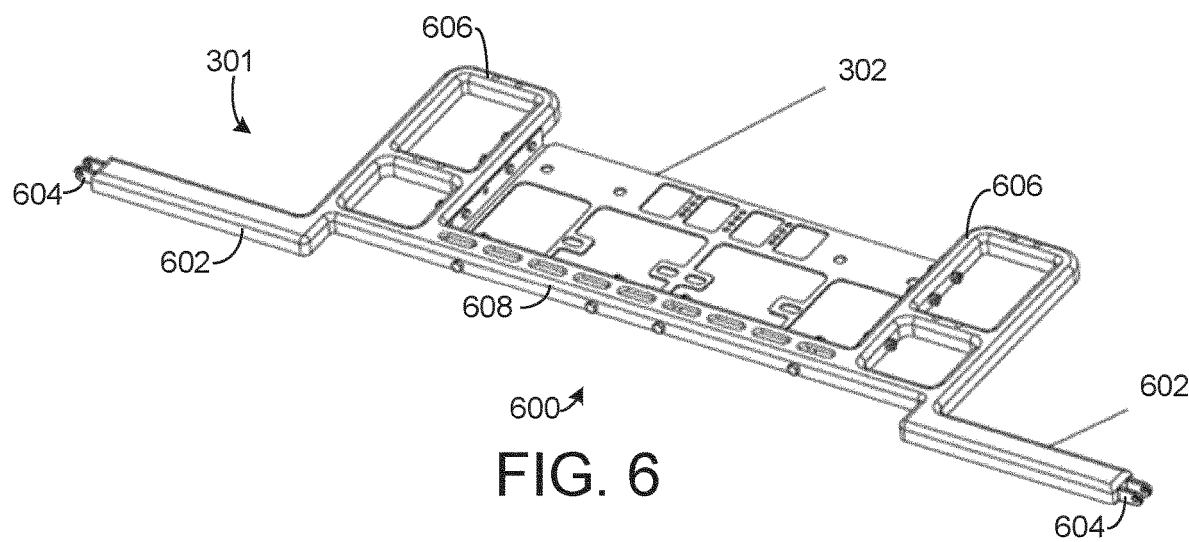
FIG. 6 is a perspective view of a support frame of the braking system of FIG. 1, according to an exemplary embodiment.
Figure 7:
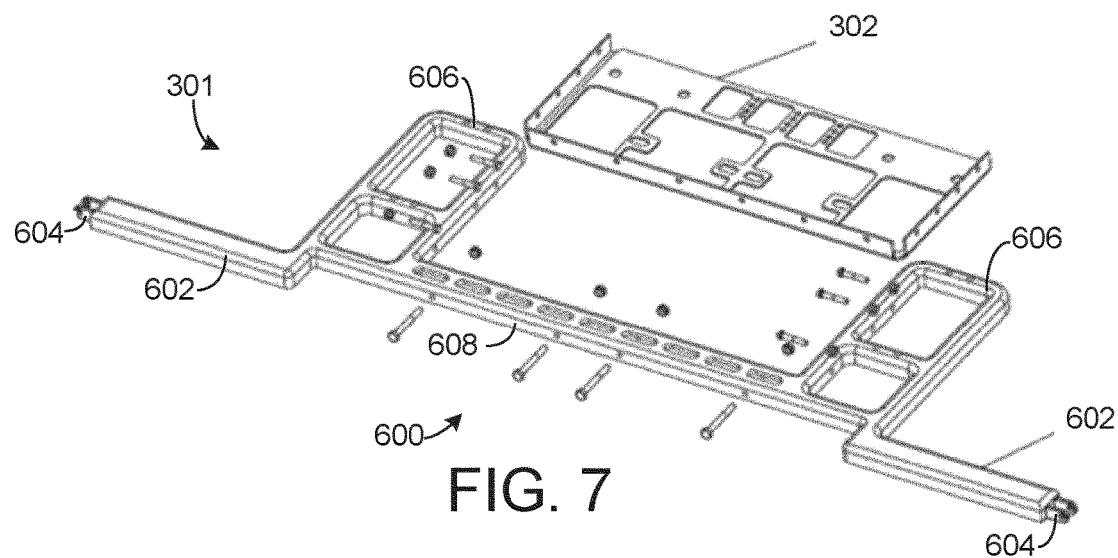
FIG. 7 is a perspective, exploded view of the support frame of FIG. 6 with a support plate, according to an exemplary embodiment.

Referring now to FIGS. 6-7, perspective views of the support frame 301 and support plate 302 are shown, according to an exemplary embodiment. FIG. 6 shows the support frame 301 and support plate 302 as assembled for use in the braking system 102, while FIG. 7 shows an exploded view of the support frame 301 and the support plate 302.

The support frame 301 is shown to have a u-shaped central region 600 and rods 602 extending from either side of the u-shaped central region 600. The rods 602 include brackets 604, which are shown in detail in FIG. 8 and described with reference thereto. The brackets 604 are configured to be coupled to the chassis 104 of the vehicle 100. The rods 602 are substantially rigid and facilitate a transfer of force between the braking system 102 and the vehicle 100. In various embodiments, various additional or alternative rods and brackets are included to provide for coupling of the support frame 301 to vehicles 100 of various configurations, sizes, etc. and/or for providing additional support and structural integrity between the braking system 102 and the vehicle 100. For example, in some embodiments, additional brackets may extend upwards from various locations on the frame 301 to facilitate coupling of the frame 301 to the vehicle 100 in various locations.

The u-shaped central region 600 of the support frame 301 includes a pair of rectangular frames 606 separated by a central bar 608. The rectangular frames 606, the central bar 608, and the rods 602 are positioned in a plane. The rectangular frames 606 form a first support and a second support and extend orthogonally from the central bar 608 to form the u-shaped central region 600.

The u-shaped central region 600 is configured to receive the support plate 302, which is shaped to fit between the rectangular frame 606 and to be positioned along the central bar 608. As shown in FIGS. 6-7, the support plate 302 is coupled to the central bar 608 and rectangular frame 606 using multiple bolts and nuts. In other embodiments, other fasteners are used (rivets, welds, screws, clips, clamps, etc.).

The support frame 301 and the support plate 302 may be made primarily of steel or other suitable metal or compound. The support frame 301 and the support plate 302 are substantially rigid. In some embodiments, the support frame 301 and the support plate 302 include cut-outs, voids, holes, etc. that reduce the weight of the support frame 301 and support plate 302.

Figure 8:
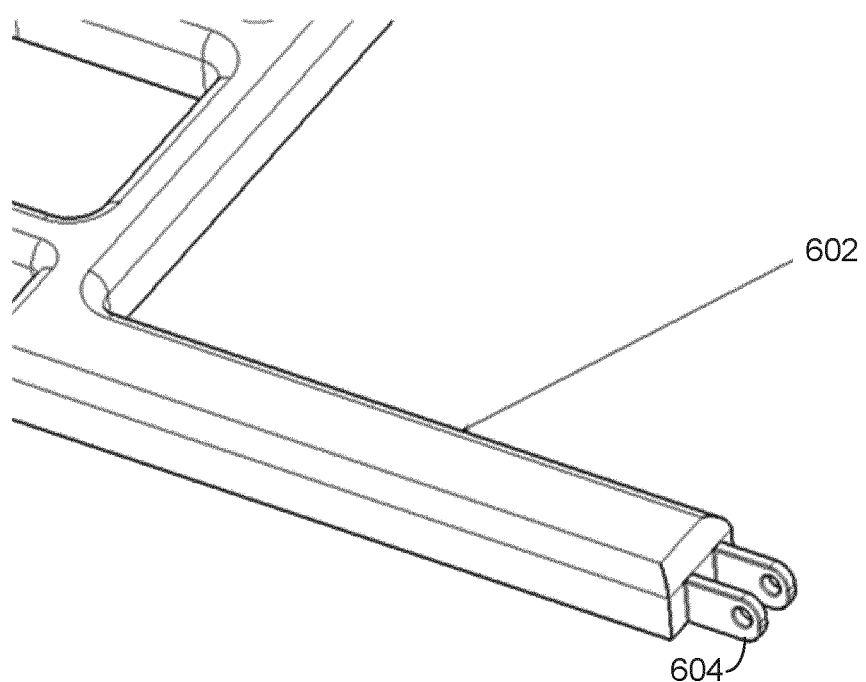
FIG. 8 is a perspective view of a bracket of the support frame of FIG. 6, according to an exemplary embodiment.

Referring now to FIG. 8, a close-up view of a rod 602 and bracket 604 is shown, according to an exemplary embodiment. The rod 602 may have a substantially rectangular cross-section. As shown in FIG. 8, the bracket 604 includes a pair of parallel protrusions 800, each of which has a hole extending therethrough. The protrusions 800 can be coupled to the chassis 104 by passing a bolt or other fastener through the protrusions 800 and the chassis 104.

Figure 9:
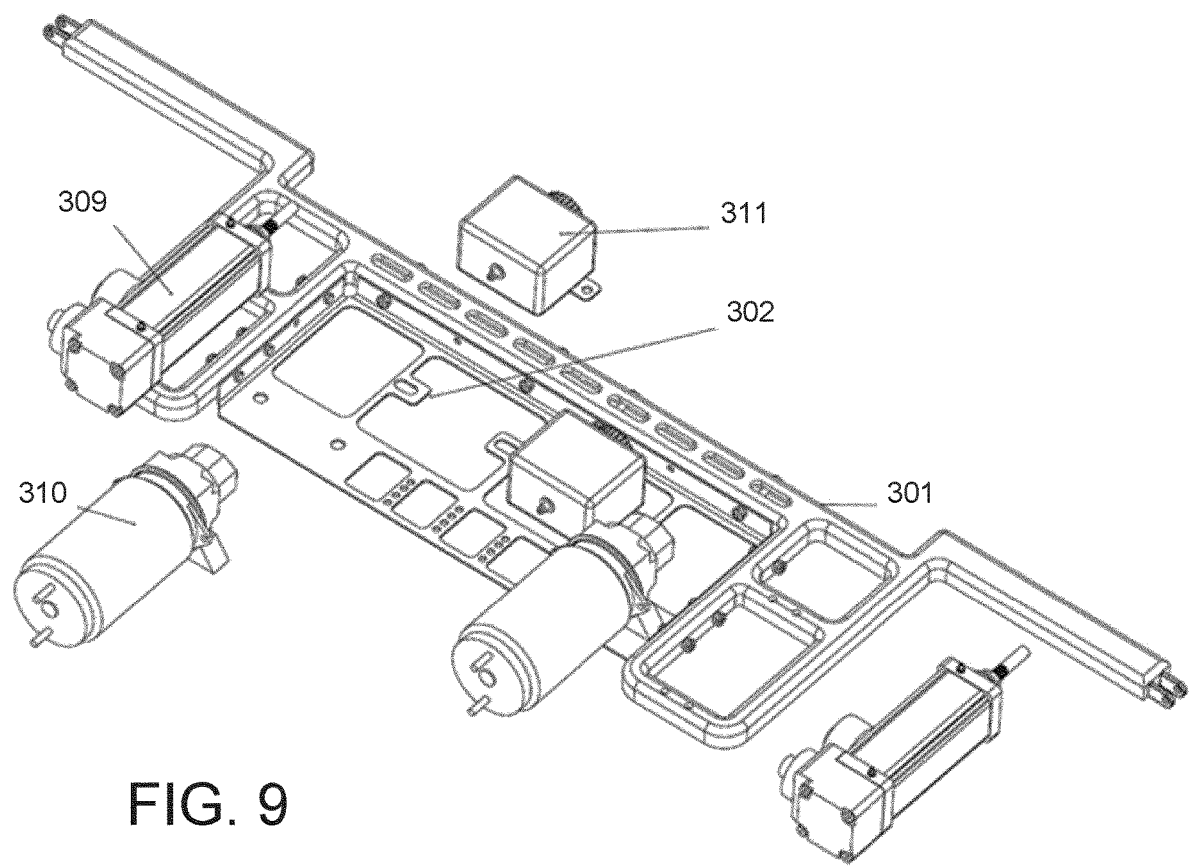
FIG. 9 is an exploded perspective view of a portion of the braking system of FIG. 1, according to an exemplary embodiment.

Referring now to FIG. 9, a perspective, exploded view of the support frame 301 and support plate 302 receiving a pair of linear actuators 309, hydraulic reservoirs 310, and hydraulic pumps 311 is shown. As shown in FIG. 6, each linear actuator 309 is positioned at and coupled to one of the rectangular frames 606 of the support frame 301. The hydraulic reservoirs 310 and the hydraulic pumps 311 are shown as positioned at and coupled to the support plate 302.

In other embodiments, one or more of the linear actuators 309, hydraulic pumps 311, hydraulic reservoirs 310, or various other elements of the braking system 102 are directly coupled to the chassis 104 or other structure on the undercarriage of the vehicle 100. In such cases, the undercarriage of the vehicle 100 supports forces created during deployment of the braking system 102.

Figure 10:
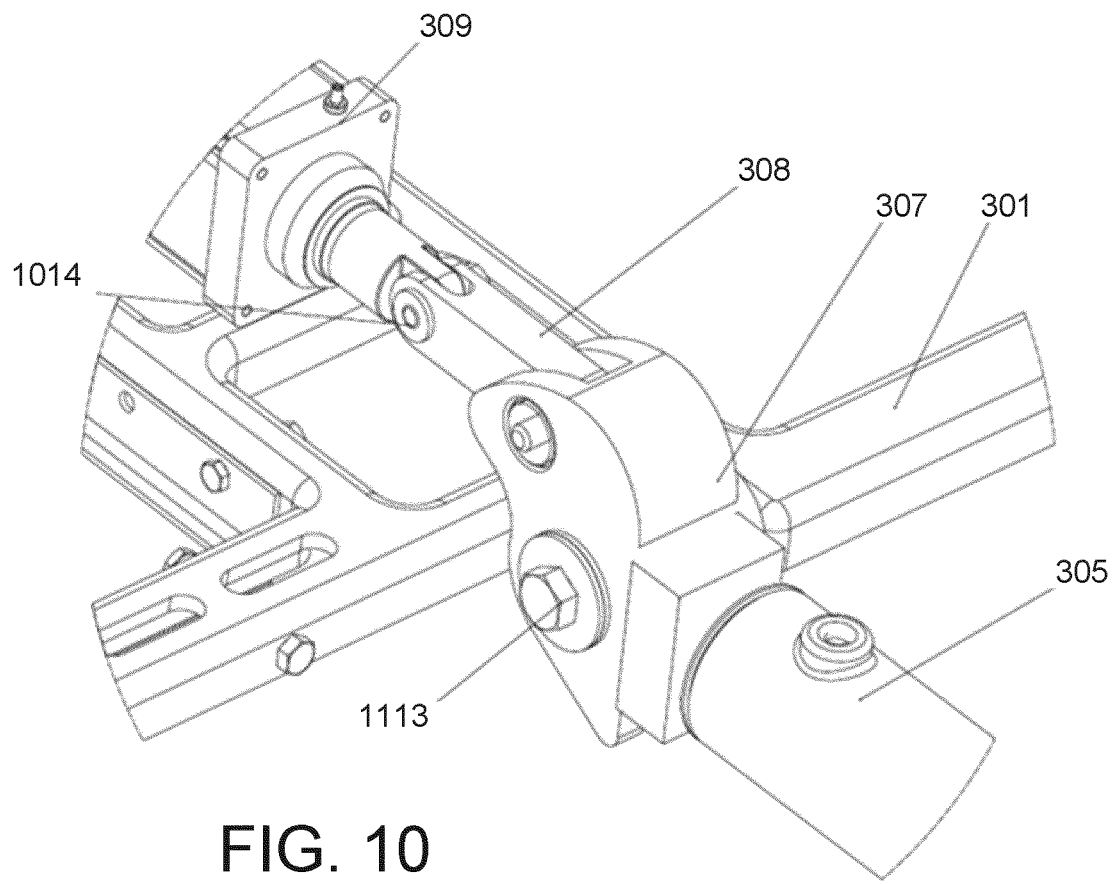
FIG. 10 is a perspective view of a rotating joint of the braking system of FIG. 1 with the braking system in the non-deployed state, according to an exemplary embodiment.
Figure 11:
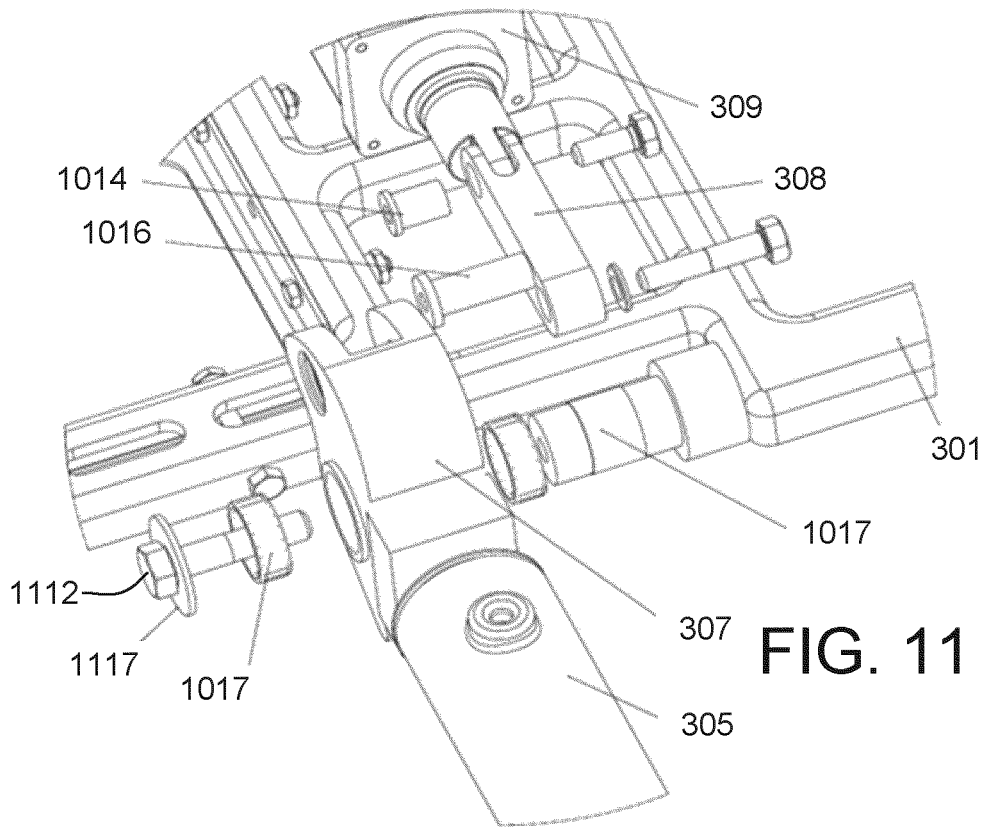
FIG. 11 is an exploded view of the rotating joint of FIG. 10, according to an exemplary embodiment.
Figure 12:
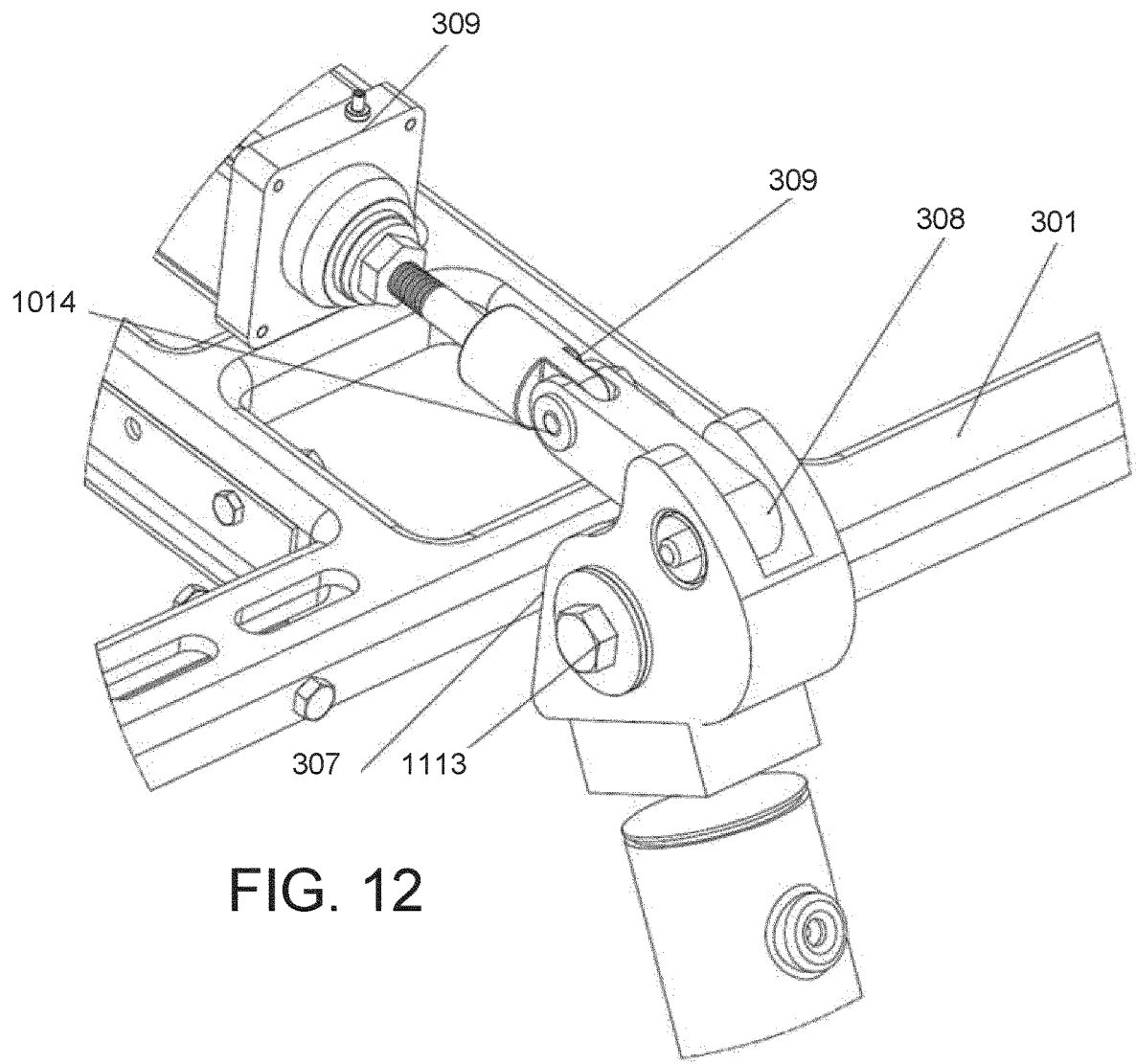
FIG. 12 is another perspective view of the rotating joint of FIG. 10 with the braking system in the deployed state, according to an exemplary embodiment.

Referring now to FIGS. 10-12, various views of the rotating joint 307 coupled to the linear actuator 309 and the support frame 301 are shown, according to exemplary embodiments. The linear actuator 309 is shown as coupled to rod 308 by a pin 1014. The rotating joint 307 is shown as rotatably coupled to the rod 308 by a pin 1016. That is, the rotating joint 307 can rotate about the pin 1016 to change orientation relative to the rod 308 and the linear actuator 309.

The rotating joint 307 is also rotatably coupled to the frame 301. As shown, the rotating joint 307 is mounted on a bearing 1017 extending from the frame 301 and oriented parallel to the central bar 608 of the frame 301. A locking bolt 1112 and washer 1113 are configured to secure the rotating joint 307 on the bearing 1017. The rotating joint 307 is rotatable about the bearing 1017, i.e., configured to rotate about the bearing 1017 to change orientations relative to the frame 301.

Accordingly, in the embodiment shown, the rotating joint 307 is configured to pivot/rotate/hinge relative to both the rod 308 and the frame 301. As the rod 308 is extended or retracted by the linear actuator 309, the rotating joint 307 rotates about the pin 1016 and the bearing 1017. The linear actuator 309 can thereby operate to cause the rotating joint 307 to move between the non-deployed position shown in FIG. 10 (corresponding to FIG. 3) and the deployed position shown in FIG. 12 (corresponding to FIG. 4). The arms 112 are coupled to the rotating joints 307 and change orientation with rotation of the rotating joints 307.

Figure 13:
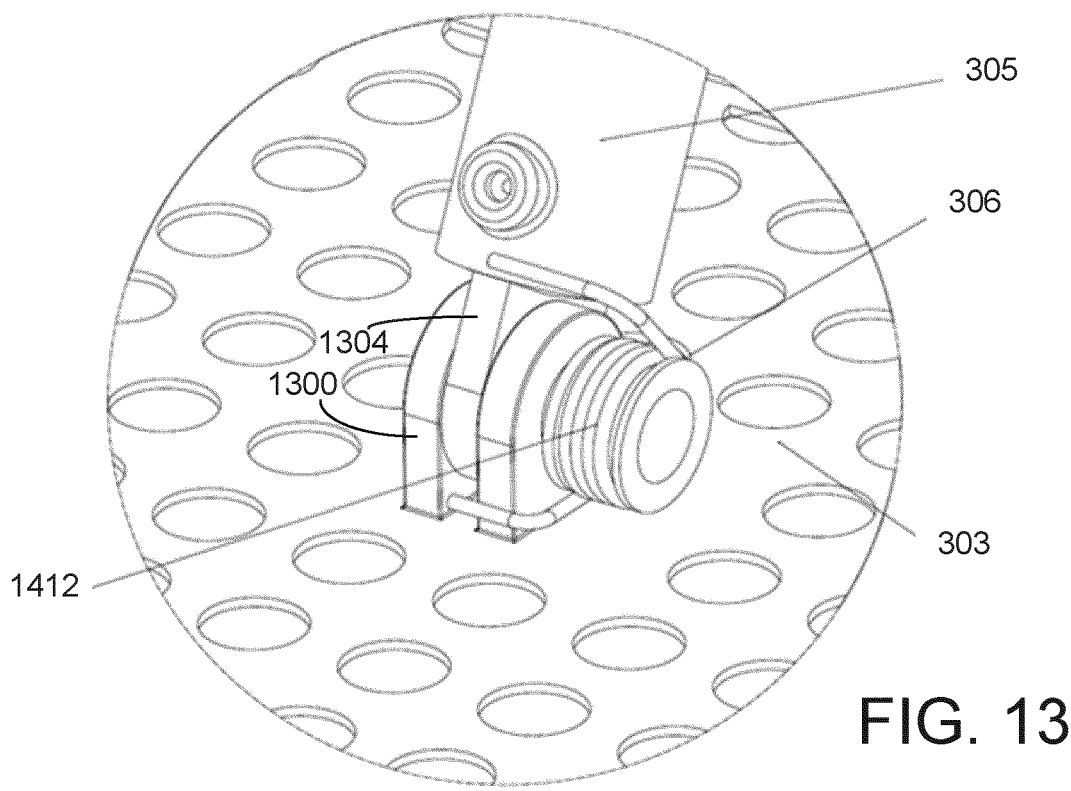
FIG. 13 is a perspective view of a pivoting connector of the braking system of FIG. 1, according to an exemplary embodiment.
Figure 14:
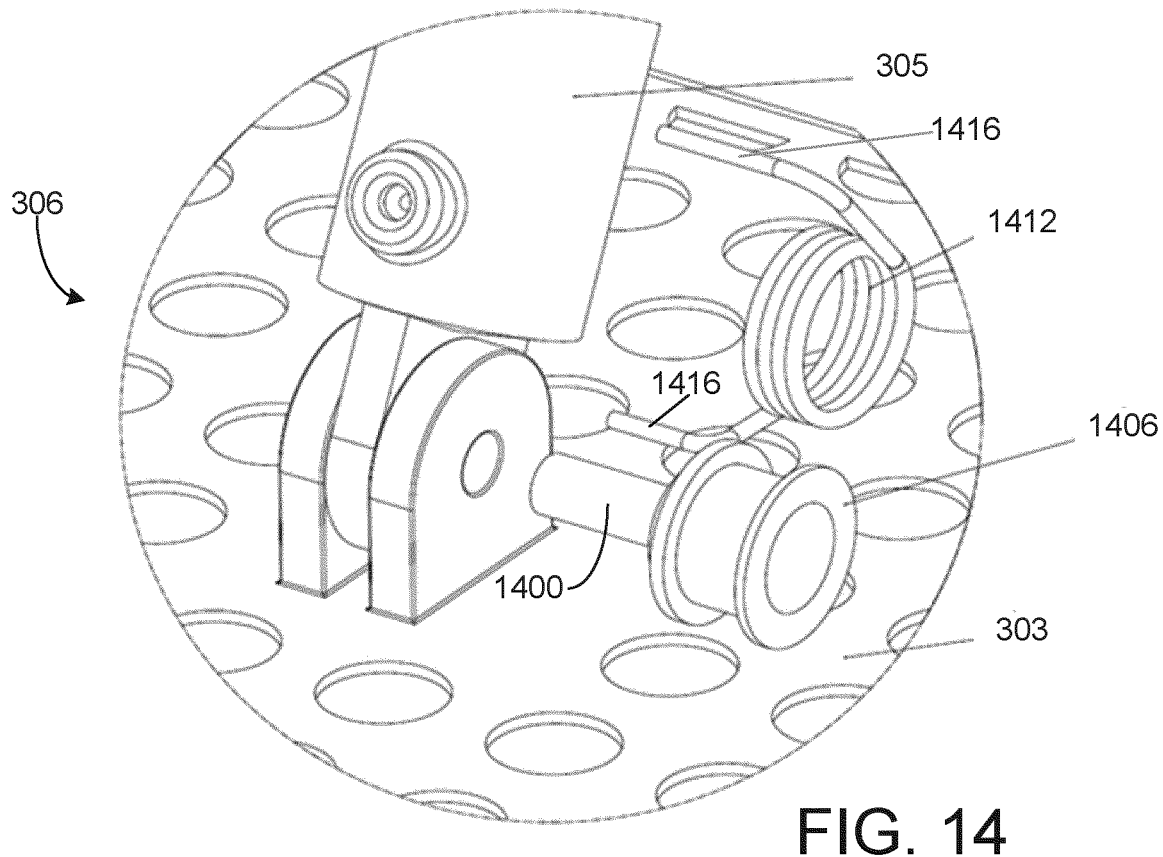
FIG. 14 is an exploded view of the pivoting connector of FIG. 13, according to an exemplary embodiment.

Referring now to FIGS. 13 and 14, a pivoting connector 306 pivotally connects the moveable portion 110 (i.e., reinforcing plate 303 and friction mat 304) to the arms 112. The pivoting connector 306 includes a pair of protrusions 1300 that extend from the reinforcing plate 303 and normal to the surface of the reinforcing plate 303. The protrusions 1300 are spaced apart from one another to receive a tab 1304 thereby. The tab 1304 extends from an end of an arm 112. Each of the protrusions 1300 and the tab 1304 include a hole extending therethrough. The holes can be aligned to receive a pin 1406 that extends through the protrusions 1300 and the tab 1304 and couples the reinforcing plate 303 to the arm 112.

The pin 1400 is coupled to a spool 1406. The spool 1406 is positioned adjacent the protrusions 1300 and between the reinforcing plate 303 and the arm 112. The spool 1406 retains a torsion spring 1412. The torsion spring 1412 is wound around the spool 1406 and has a first end 1414 configured to push against the reinforcing plate and a second end 1416 that configured to push against the arm 112. The torsion spring 1412 acts to force rotation of the reinforcing plate 303 relative to the arm 112 to cause the reinforcing plate 303 to be biased into an orientation substantially parallel with the arm 112. The torsion spring 1412 is also configured to allow rotation of the reinforcing plate 303 away from the orientation parallel with the arm 112 when a force is applied to the reinforcing plate 303. For example, when the braking system 102 operates to bring the moveable portion 110 into contact with the travelling surface, the force between the travelling surface and the moveable portion 110 can cause the torsion spring 1412 to compress and the moveable portion 110 to rotate into an orientation substantially parallel with the travelling surface and an angle relative to the arms 112. The pivoting connector 306 thereby causes the moveable portion 110 to be substantially parallel to the travelling surface both when the braking system is in the non-deployed state (as in FIG. 3) and when in the braking system is in the deployed state with the moveable portion 110 in contact with the travelling surface (as in FIG. 4).

In some embodiments, the torsion spring 1412 is omitted. In some such embodiments, the reinforcing plate 303 is weighted to automatically rotate (i.e., under the force of gravity) to a position substantially parallel with the travelling surface. For example, in some embodiments, weights are positioned along an edge of the reinforcing plate 303 closest to the non-moving portion 108. The weights cause the reinforcing plate 303 to be biased towards rotation clockwise about the pin 1400. In the non-deployed state (e.g., as in FIG. 3) contact with the underside of the vehicle 100 may prevent the reinforcing plate 303 from rotating beyond a parallel position. In the deployed state, contact with the travelling surface may force the reinforcing plate 303 to be parallel with the travelling surface.

In other embodiments in which the torsion spring 1412 is omitted, an actuator or other electrically-controllable mechanized rotating device is included at the position of the torsion spring 1412 and configured to automatically rotate the reinforcing plate 303 and friction mat 304 to the desired orientations (e.g., to maintain the friction mat 304 in an orientation parallel to the travelling surface) in response to deployment or retraction of the braking system 102. In some embodiments, a brake, block, restrictor, etc. is included on or around the projection 1300 which prevents rotation of the reinforcing plate 303 relative to the arm 112 out of an acceptable range of positions.

Figure 15:
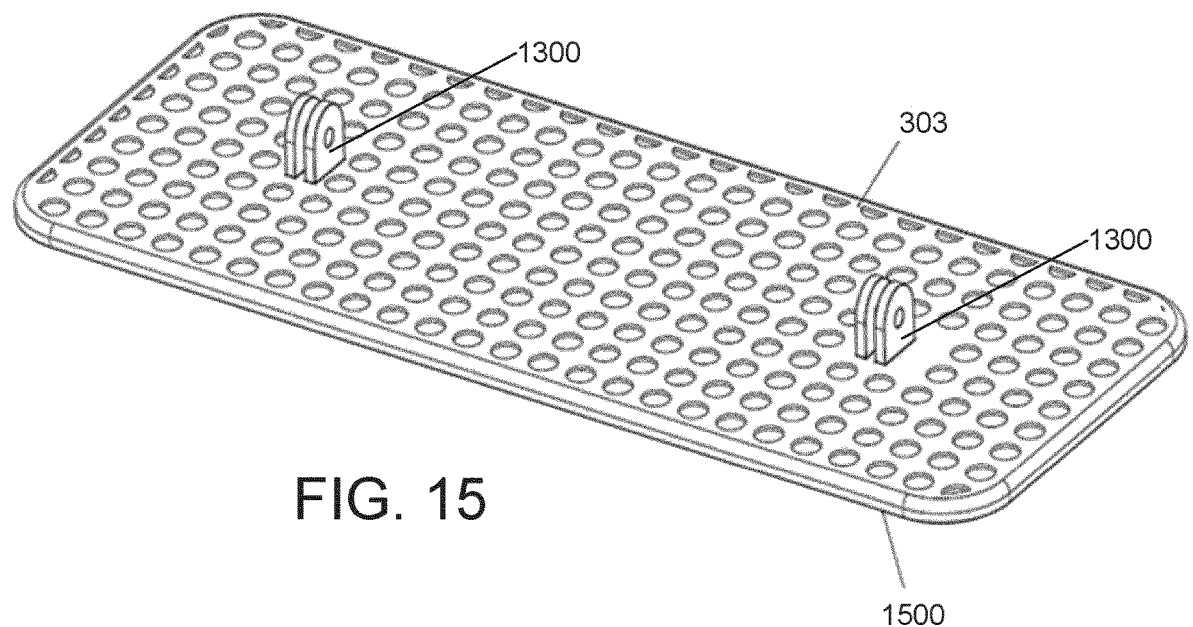
FIG. 15 is perspective view of a reinforcing plate of the braking system of FIG. 1, according to an exemplary embodiment.
Figure 16:
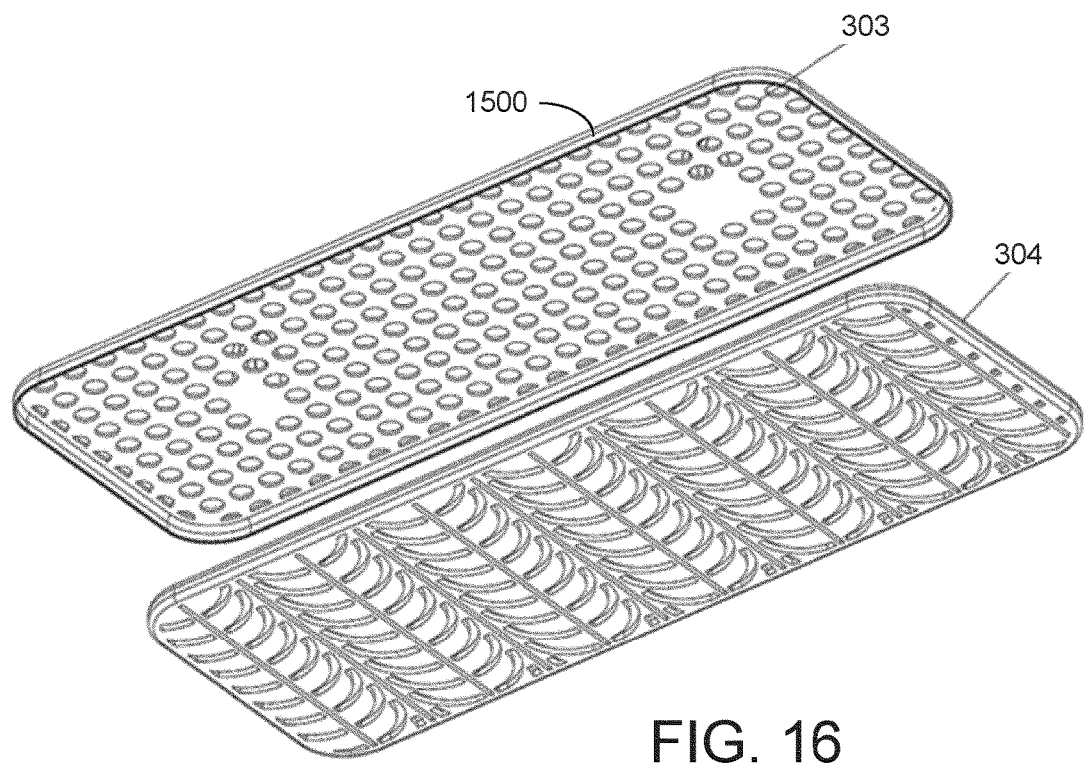
FIG. 16 is a perspective, exploded view of a bottom of the reinforcing plate of FIG. 15 and a friction pad of the braking system of FIG. 1, according to an exemplary embodiment.

Referring now to FIGS. 15-16, views of the moveable portion 110 are shown, according to exemplary embodiments. The moveable portion 110 includes the reinforcing plate 303 coupled to the friction mat 304. Protrusions 1300 extend from a top side of the reinforcing plate 303 and are configured as described above with reference to FIGS. 13-14. The protrusions 1300 are shown as located approximately along a central axis of the reinforcing plate 303. The reinforcing plate 303 is substantially rigid and made of stainless steel or other metal alloy.

In the example shown, the reinforcing plate 303 includes holes extending therethrough and spaced about the reinforcing plate 303. The holes may reduce the weight of the reinforcing plate 303 and/or facilitate heat transfer through the reinforcing plate 303. As shown, the holes are circular. It should be understood that various patterns, shapes, sizes, etc. of such holes are possible (e.g., square, triangle, hexagonal, honeycomb, irregular, etc.). In some embodiments, indents extending partially through the reinforcing plate 303 are included instead of or in addition to such holes.

The reinforcing plate 303 is shown to include an outer lip 1500 that surrounds the reinforcing plate 303. The friction mat 304 is positioned within the outer lip 1500 and abutting the reinforcing plate 303. The friction mat 304 is configured to provide friction between the travelling surface and the braking system 102. The friction mat 304 may include various materials configured to provide a high coefficient of friction while reducing a risk of roadway damage, vehicle damage, sparks/fires, etc. For example, the friction mat 304 may include rubber or a similar material (e.g., tire material). In the example shown, the friction mat 304 includes a surface pattern that increases the amount of friction applied by the friction mat 304.

The braking system 102 is thereby configured to be retained in the non-deployed state of FIG. 3 for an indefinite amount of time and to be quickly deployed to generate a frictional, braking force to resist, slow, stop, etc. motion of the vehicle 100. It should be understood that many variations are possible in various embodiments. For example, the braking system 102 may include different numbers of arms 112, linear actuators 309, rotating joints 307, hydraulic pumps 311, etc. in various embodiments. As another example, the linear actuators 309 may be hydraulic actuators, electrical actuators, pneumatic actuators, etc., and the force applicators 305 may be electrical linear actuators, in various combinations in various embodiments. As another example, various shapes and relative dimensions of various components are contemplated by the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other and with the two members coupled to each other using a separate intervening member and any additional intermediate members coupled with one another, or with the two members coupled to each other using an intervening member that is integrally formed as a single unitary body with one or both of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," "up," "down") are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the braking system 102 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A braking system comprising:
a frame having a first support and a second support;
a first rotating joint defining a first pivot point and a second pivot point, the first pivot point of the first rotating joint coupled to the first support;
a second rotating joint defining a first pivot point and a second pivot point, the first pivot point of the second rotating joint coupled to the second support;
a first actuator coupled to the second pivot point of the first rotating joint;

a second actuator coupled to the second pivot point of the second rotating joint;

a brake pad defining a first connection point and a second connection point;

a first arm having a first end coupled to the first rotating joint and an opposing second end coupled to the first connection point of the brake pad wherein the first arm is or includes a third actuator; and a second arm having a first end coupled to the second rotating joint and an opposing second end coupled to the second connection point of the brake pad wherein the second arm is or includes a fourth actuator.

2. The braking system of claim 1, wherein the brake pad includes a reinforcing plate and a friction mat coupled to the reinforcing plate.

3. The braking system of claim 2, wherein the reinforcing plate defines a plurality of holes.

4. The braking system of claim 2, wherein the reinforcing plate includes a peripheral lip, and wherein the friction mat is received within and surrounded by the peripheral lip.

5. The braking system of claim 1, wherein the frame includes a support plate detachably coupled to the first support and the second support.

6. The braking system of claim 5, further comprising a reservoir coupled to the support plate, wherein the reservoir is fluidly coupled to at least one of the first actuator or the second actuator.

7. The braking system of claim 1, further comprising a first torsion spring positioned at the first connection point and a second torsion spring positioned at the second connection point, wherein the first torsion spring and the second torsion spring are positioned to bias the brake pad relative to the first arm and the second arm.

\* \* \* \* \*